United States Patent [19]
Spelman et al.

[11] Patent Number: 5,761,311
[45] Date of Patent: Jun. 2, 1998

[54] BLIND ENCRYPTION

[75] Inventors: Jeffrey F. Spelman, Duvall; Matthew W. Thomlinson, Bellvue, both of Wash.

[73] Assignee: Microsoft Corporation, Redmond, Wash.

[21] Appl. No.: 838,695

[22] Filed: Apr. 9, 1997

Related U.S. Application Data

[62] Division of Ser. No. 530,022, Sep. 19, 1995, Pat. No. 5,638,445.

[51] Int. Cl.$^6$ ................................................ H04L 9/30
[52] U.S. Cl. ................................................ 380/30
[58] Field of Search ................................................ 380/30

[56] References Cited

U.S. PATENT DOCUMENTS

| | | | |
|---|---|---|---|
| 4,759,064 | 7/1988 | Chaum | 380/30 |
| 4,926,480 | 5/1990 | Chaum | 380/30 |
| 4,996,711 | 2/1991 | Chaum | 380/30 |
| 5,606,617 | 2/1997 | Brands | 380/30 |
| 5,638,445 | 6/1997 | Spelman et al. | 380/30 |

*Primary Examiner*—Salvatore Cangialosi
*Attorney, Agent, or Firm*—Michaelson & Wallace; Peter L. Michaelson

[57] ABSTRACT

A method of processing encrypted communications sent by a first party, the method including the steps of: receiving from the first party a message that has a first part, a second part, a third part and a fourth part, wherein the first part includes a first block of information that is encrypted by using a key k1, the second part includes a second block of information that is encrypted by using a key k2, the third part includes a third block of information that is encrypted by using a key R, and the fourth part includes a fourth block of information that is encrypted by using the key R, wherein the third block of information includes k1 and the fourth block of information includes k2; blinding the fourth part; sending the third part and the blinded fourth part to a recryptor; receiving from the recryptor the k1 key re-encrypted by using a first key; and receiving from the recryptor a fifth block of information which is the blinded fourth block of information that has been encrypted by using a second key.

3 Claims, 5 Drawing Sheets

BLIND ENCRYPTION

This application is a division of patent application Ser. No. 08/530,022 filed on Sep. 19, 1995, now U.S. Pat. No. 5,638,445.

BACKGROUND OF THE INVENTION

The invention relates generally to public-key cryptography and key distribution.

Key distribution is a common problem with public-key cryptography. Many times, and increasingly often in electronic commerce, a user may wish to communicate with another user (or merchant, as the case may be), without first having his key. For example, in electronic commerce, the situation may arise where a consumer wants to purchase something from a merchant but does not have the merchant's public key or the public key of the merchant's bank. We may assume, however, that the consumer does have the merchant's name and/or the merchant's E-mail address. Since the consumer has the merchant's email address, she can easily get the information to the merchant, but without the merchant's public key cannot encrypt the GSO for the merchant or, more importantly, the PI for the merchant's bank.

To bootstrap communications, a Diffie-Hellman protocol could be used, or a directory service might be consulted. Both of these methods have the same drawbacks for the user (consumer): they require multiple passes and services must be immediately available in order for communication to occur.

A scheme is described below which solves the problem in a single pass.

SUMMARY OF THE INVENTION

A public service is made available to decrypt and re-encrypt messages to users (e.g. merchants) which are first encrypted with its well-known key. A novel technique, which we call blind-encryption, is used to protect against snooping by the service.

The invention is a method of processing encrypted communications sent by a first party. The method includes the step of receiving from the first party a message that has a first part, a second part, a third part and a fourth part, wherein the first part includes a first block of information that is encrypted by using a key k1, the second part includes a second block of information that is encrypted by using a key k2, the third part includes a third block of information that is encrypted by using a key R, and the fourth part includes a fourth block of information that is encrypted by using the key R, wherein the third block of information includes k1 and the fourth block of information includes k2. The method further includes the steps of blinding the fourth part; and sending the third part and the blinded fourth part to a recryptor.

In preferred embodiments, the method also includes the steps of receiving from the recryptor the k1 key re-encrypted by using a first key; and receiving from the recryptor a fifth block of information which is the blinded fourth block of information that has been encrypted by using a second key. In addition, the key R is a public key of a public key-private key pair and each of the keys k1 and k2 are shared keys and are different keys. The first key is a first public key having associated therewith a first private key and the second key is a second public key having associated therewith a second private key. The method further includes the steps of unblinding the fifth block of information; sending the second part to a third party; and sending the unblinded fifth block of information to the third party. Alternatively, the method includes the steps of sending the second part to a third party; sending the blinded fifth block of information to the third party; and sending a blinding factor to the third party so that the third party can unblind the blinded fifth block of information. Also, the method includes using the first private key to decrypt the re-encrypted key k1; using key k1 to decrypt the first part; and performing subsequent actions responsive to the information that is disclosed through decrypting the first part.

In general, in another aspect, the invention is a method of communicating confidential information to a second party, wherein the confidential information also includes information intended for a third party. The method includes the steps of encrypting a first block of information by using a key k1; encrypting a second block of information by using a key k2; encrypting a third block of information by using a key R, and wherein the third block of information includes the k1 key; encrypting a fourth block of information by using the key R, wherein the fourth block of information includes the k2 key and other information that is intended for the third party; and sending the encrypted first, second, third, and fourth blocks of information to the second party.

In general, in yet another aspect, the invention is a method of processing a communication from a first party. The method includes the steps of receiving from the first party a message that includes a first part and a second part, wherein the first part includes a first block of information that is encrypted by using a first key and the second part includes a second block of information that is blinded and encrypted by using the first key; decrypting the first part of the message to produce a first decrypted message; encrypting at least a portion of the first decrypted message using a second key to produce a re-encrypted third block of information; decrypting the second part of the message to produce a decrypted, blinded message; re-encrypting the decrypted, blinded message using a third key to produce an re-encrypted/blinded message; and sending the re-encrypted third block of information and the re-encrypted/blinded message to the first party.

In general, in still another aspect, the invention is an encryption method including the steps of receiving from a first party a message that has a first part, wherein the first part includes a first block of information that is encrypted by using a public key R of a recryptor's public key-private key pair; blinding the first part; sending the blinded first part to a recryptor; and receiving from the recryptor a second block of information which is the first block of information blinded and decrypted using the private key of the recryptor's public key-private key pair.

In preferred embodiments, the encryption method further includes unblinding the second block of information.

In general, in still another aspect, the invention is an encryption method including the steps of receiving from a first party a blinded message that was also encrypted by using a public key R of a public key-private key pair; decrypting the blinded message by using the private key of the public key-private key pair; and sending the decrypted, blinded message back to the first party.

In general, in another aspect, the invention is an apparatus for processing an encrypted communication sent by a first party, wherein the encrypted communication includes a first part, a second part, a third part and a fourth part, wherein the first part includes a first block of information that is encrypted by using a key k1, the second part includes a second block of information that is encrypted by using a key k2, the third part includes a third block of information that is encrypted by using a key R, and the fourth part includes a fourth block of information that is encrypted by using the key R, wherein the third block of information includes k1 and the fourth block of information includes k2. The apparatus includes means for blinding the fourth part; means for sending the third part and the blinded fourth part to a recryptor; means for receiving from the recryptor the k1 key re-encrypted by using a first key and a fifth block of information which is the blinded fourth block of information that has been encrypted by using a second key.

In preferred embodiments, the apparatus also includes means for unblinding the fifth block of information; means for sending the second part to a third party; and means for sending the unblinded fifth block of information to the third party. The apparatus further includes first means for decrypting the re-encrypted key k1, the first means using said first private key; and second means for decrypting the first part, the second means using key k1 to perform the decryption.

In general, in another aspect the invention is an apparatus for processing a communication from a second party, the communication including a first part and a second part, wherein the first part includes a first block of information that is encrypted by using a first key and the second part includes a second block of information that is blinded and encrypted by using the first key. The apparatus includes means for decrypting the first part of the message to produce a first decrypted message; means for encrypting at least a portion of the first decrypted message using a second key to produce a re-encrypted third block of information; means for decrypting the second part of the message to produce a decrypted, blinded message; means for re-encrypting the decrypted, blinded message using a third key to produce an re-encrypted/blinded message; and means for sending the re-encrypted third block of information and the re-encrypted/blinded message to the second party.

In general, still another aspect, the invention is a method of processing encrypted communications sent by a first party. The method includes the steps of receiving from the first party a message that has a first part, a second part, a third part and a fourth part, wherein the first part includes a first block of information that is encrypted by using a key k1, the second part includes a second block of information that is encrypted by using a key k2, the third part includes a third block of information that is encrypted by using a key R, and the fourth part includes a fourth block of information that is encrypted by using the key R, wherein the third block of information includes k1 and the fourth block of information includes k2; blinding the fourth part; and sending the third part and the blinded fourth part to a recryptor.

The invention has the advantage that the recryptor does not see what information the merchant has received. In addition, the invention does not require an extra pass or "immediately available" services. Instead, it allows transactions to immediately occur where they were not possible before.

Other advantages and features will become apparent from the following description of the preferred embodiment and from the claims.

DESCRIPTION OF THE PREFERRED EMBODIMENTS

Figure 1:
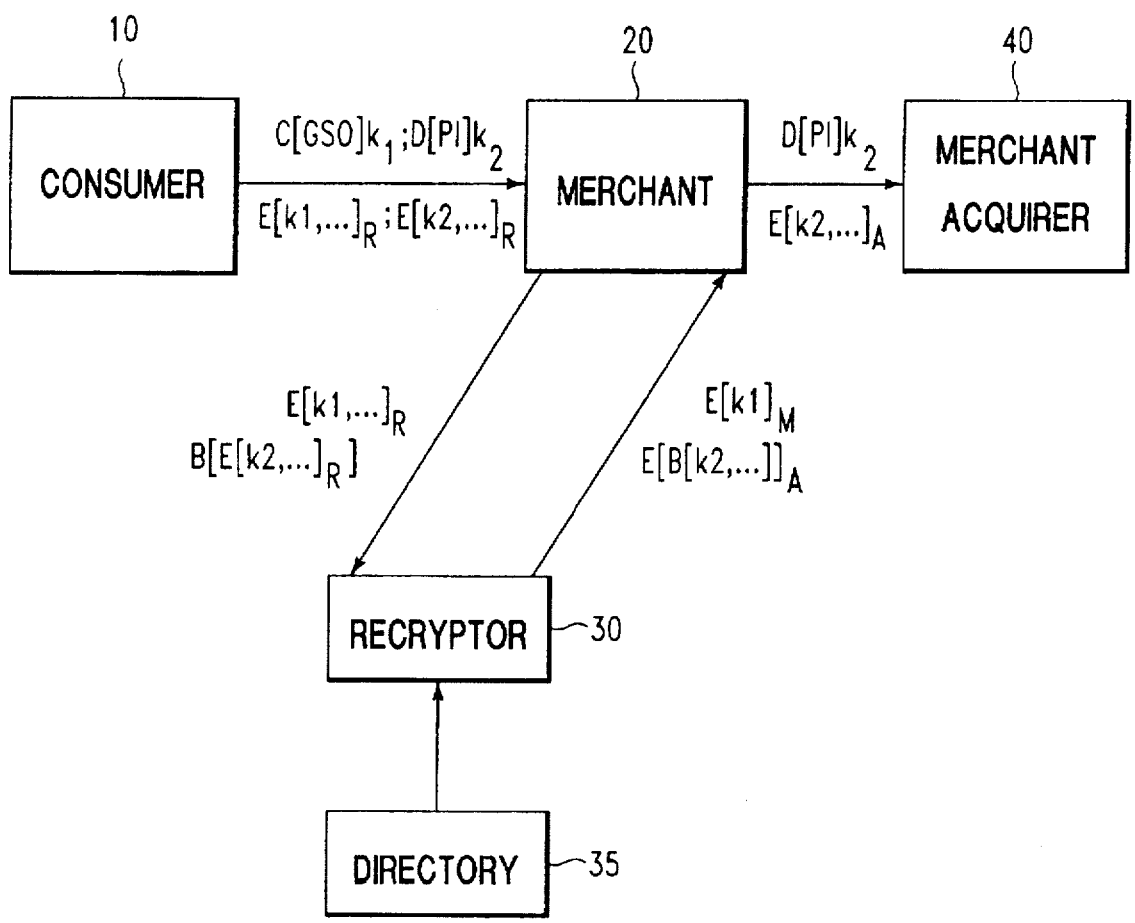
FIG. 1 is an overview of the information exchange that takes place in accordance with an embodiment of the invention.

Referring to FIG. 1, a protocol which illustrates the invention involves four participants: a consumer 10, a merchant 20, a recryptor 30, and a merchant acquirer 40 (e.g. a bank). For purposes of the following discussion, it is assumed that consumer 10 wishes to purchase certain goods and/or services from merchant 20. Consumer 10 does this by sending a GSO (i.e., goods and services order) to merchant 20 along with a PI (i.e., purchase instruction) that is typically intended for the merchant's acquirer (e.g. bank). Merchant 20 processes the GSO and passes the PI on to its merchant acquirer 40, which processes the financial aspects of the transaction. As will be described shortly, the services of recryptor 30 are used to achieve a desired level of security in the exchange of information between the entities. Therefore, the protocol that is to be described assumes the existence of a public service (i.e., the recryptor) that everybody trusts.

In the figures, the different entities are represented by blocks and the transfers of information from one entity to another are indicated by lines interconnecting the appropriate blocks. Each line represents a transfer of certain information from one entity to another in the direction indicated by an arrow at the end of the line. The information that is transferred is summarized symbolically below the lines.

Though each block is labeled and will be described below as representing a particular entity, it can be implemented by a computing device which performs the computations and the communications that are carried out by that entity. The computing devices might be any of a large variety of electronic devices including, for example, a personal computer, a PDI, a smart-card, a palm-top computer, or a more powerful workstation, just to name a few. In addition, the communications media over which the transfers of information take place can also be any of a large number of possibilities, including telephone lines, cable, the Internet, satellite transmissions, or radio transmissions, for example. In other words, it is not intended that the invention be limited with regard to either the types of devices that are used or the methods of communication that are employed. The possibilities are limited only by ones imagination.

It is assumed for purpose of the following discussion that merchant 20, merchant acquirer 40 and recryptor 30 each has a public/private key pair. The private key is secret and the public key is, as the name indicates, publicly known. It is assumed, however, that consumer 10 at the time of the transaction does not know the public keys of either merchant 20 or merchant acquirer 40; but he does know how to communicate with merchant 20 (e.g. the E-mail address of merchant 20) and he knows the public key of recryptor 30.

In the description and in the accompanying figures, the following terminology is used:

| indicates concatenation;

$C[x]_y$ indicates that data x is encrypted with a stream cipher key y;

$D[x]_y$ indicates that data x is encrypted with a block cipher key y;

$E[x]_y$ indicates that data x is encrypted with key exchange public key y;

$B[x]_y$ indicates that data x has been blinded with a blinding factor y;

R is the Recryptor's key exchange public key;

M is the Merchant's key exchange public key; and

A is the Merchant Acquirer's Key exchange public key.

The Protocol

Figure 2A:
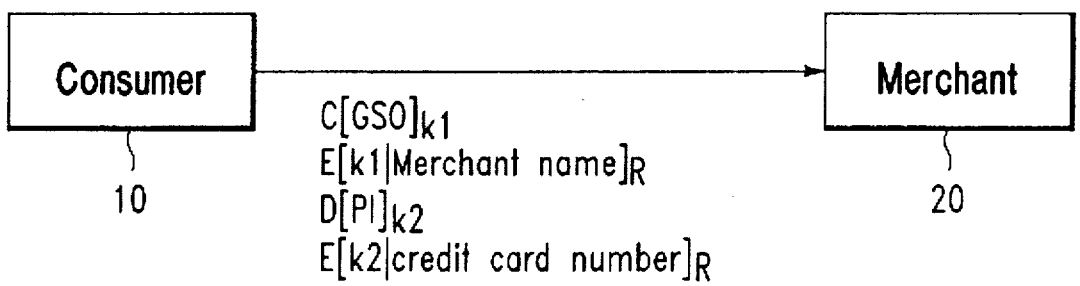
FIG. 2A shows the information that the consumer sends to the merchant.
Figure 3:
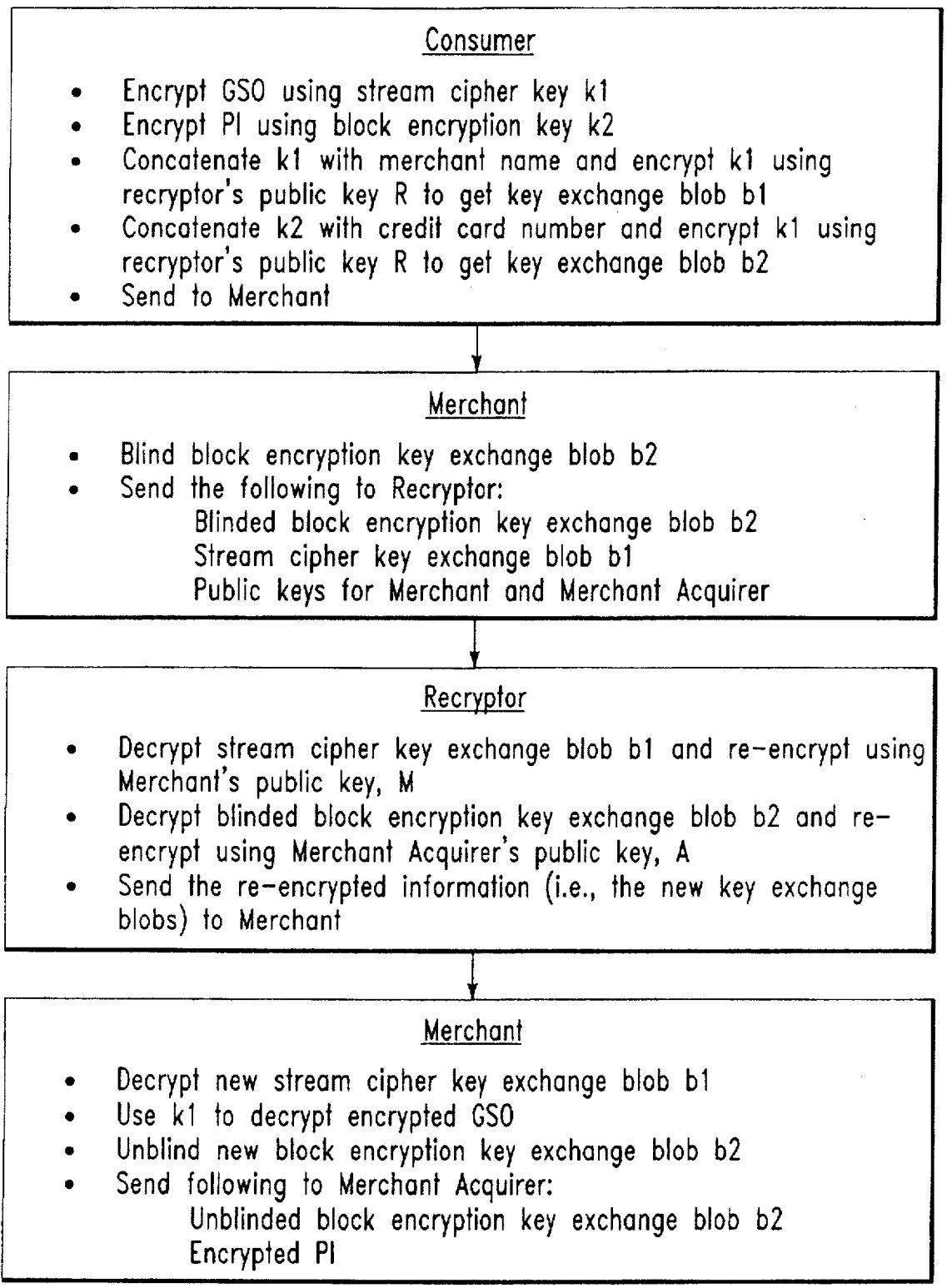
FIG. 3 is a flow chart showing operations that are performed by each of the participants in the transaction.

Referring to FIGS. 2A and 3, during the first phase of the protocol, consumer 10 generates four pieces of encrypted data for merchant 20, two of which are derived separately from the GSO and the PI, both of which are typically represented by a corresponding large string of bits. Using two different shared key encryption/decryption algorithms, consumer 10 separately encrypts the GSO and the PI. By a shared key algorithm, we mean what is generally referred to as a symmetric algorithm in which the same key is used for both encryption and decryption. In contrast, an asymmetric algorithm, of which RSA is an example, uses one key to encrypt and a different key to decrypt.

In the present example, consumer 10 uses a stream cipher algorithm with a shared key k1 to encrypt the GSO and he uses a block encryption algorithm with a second shared key k2 to encrypt PI. The encrypted GSO is symbolized by $C[GSO]_{k1}$ and the encrypted PI is symbolized by $D[PI]_{k2}$.

The particular encryption algorithms that are used are not of central importance. There are many examples in the prior art of stream cipher and block encryption algorithms which could be used. The reader is referred to the technical literature including standard texts on the subject for examples of such algorithms (e.g. see *Applied Cryptography* by Bruce Schneier, John Wiley & Sons, Inc., (1994)). In addition, it should be understood that other algorithms which may be developed in the future can also be used.

Consumer 10 then bundles each of the keys with other information to generate two plaintext messages which are then separately encrypted using the public key R of recryptor 30 to produce two key exchange blobs. Consumer 10 generates the first key exchange blob, also referred to as the GSO key exchange blob, by concatenating the stream cipher key k1 with the merchant's name, or with some other information identifying merchant 20 (e.g. E-mail address). To generate the second key exchange blob, also referred to as the PI key exchange blob, consumer 10 concatenates the block encryption key k2 with the consumer's credit card number. The two key exchange blobs are symbolized by $E[k1|Merchant\ name]_R$ and $E[k2|credit\ card\ number]_R$.

The merchant name is placed into the GSO key exchange blob so that recryptor 30, for whom the encrypted message is intended, may verify that consumer 10 truly intends that the key be encrypted for a specific merchant. In contrast, it is generally not necessary to include the acquirer's name in the PI Key exchange blob since acquirers are trusted in the system and this would only prevent one acquirer from impersonating another acquirer.

Consumer 10 sends the four pieces of encrypted information (i.e., $C[GSO]_{k1}$, $D[PI]_{k2}$, $E[k1|Merchant\ name]_R$, and $E[k2|credit\ card\ number]_R$) to merchant 20.

In the described embodiment, consumer 10 generates a random number for k1 and k2. When using RSA as the asymmetric algorithm, one constraint on k1 is that it should be smaller than the modulus of the public key R. If it is larger than the modulus of R, more than one encryption cycle will be required to encrypt k1 using the public key and that will tend to degrade performance of the protocol (e.g. reduced speed).

To decipher the encrypted GSO, merchant 20 must obtain the stream cipher key k1. However, k1 as well as the block encryption key are encrypted in such a way that only recryptor 30 can decipher them. Thus, to convert the information to a form that is useable by merchant 20 and/or merchant acquirer 40, merchant 20 utilizes the services of recryptor 30.

Figure 2B:
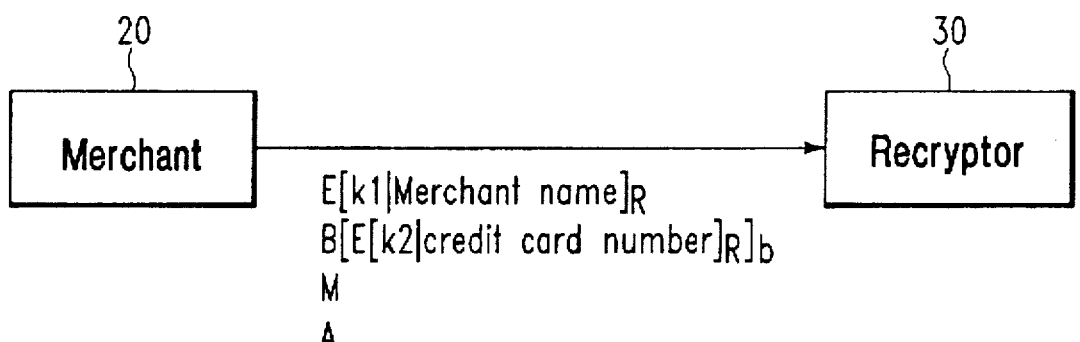
FIG. 2B shows the information that the merchant sends to the recryptor.

Referring to FIGS. 2B and 3, of the information received from consumer 10, merchant 20 sends only the two key exchange blobs on to recryptor 30. However, before sending the PI key exchange blob (i.e., $E[k2|credit\ card\ number]_R$), merchant 20 first blinds it. In the described example, merchant 20 uses a blinding key b to perform the blinding operation and produces a blinded -message identified as $B[E[k2|credit\ card\ number]_R]_b$.

The blinding is accomplished by employing a known blinding technique which uses the RSA encryption algorithm. In general, this RSA blinding technique is performed as indicated by the following mathematical algorithm. Assume that the information that is being blinded is represented by X, which of course in the present embodiment, represents k2 concatenated with the credit card number. In the mathematical description the following terminology will be used:

N indicates the modulus

R indicates the public exponent r indicates the private exponent b indicates the blinding factor (some random value 0<b<N)

Merchant 20 receives an encrypted value of X, which can be represented as $X^R$ mod N. To blind $X^R$ mod N, merchant 20 computes $b^R$ mod N and then multiplies the result by the value to be blinded (mod N of course):

$Y = (X^R\ mod\ N) \times (b^R\ mod\ N)\ mod\ N$ $Y = (Xb)^R\ mod\ N$

The value Y is blinded.

Note that it is necessary to blind the PI key exchange blob since the plaintext contains valuable consumer information, namely, a credit card number. This should not be disclosed to anybody except the entities which require it for completing a legitimate financial transaction. Recryptor 30 is not one of those entities. Moreover, recryptor 30 may also want to avoid exposure to the potential liability that tends to go along with knowing and maintaining sensitive or private information. If the recryptor does not know and cannot learn the credit card number, then the recryptor cannot be legitimately accused of misusing the information or improperly sharing it with other parties. Thus, the recryptor will also typically prefer to be protected from having to learn the consumer's credit card number.

Referring again to FIGS. 2B and 3, along with the two key exchange blobs, merchant 20 also sends the merchant's public key M and the merchant acquirer's public key A. It is assumed that this information is sent with a certification (e.g. digital signature) by some central authority with which all of the parties have registered. Techniques for certifying information (e.g. public keys) and the use of digital signatures are well known. For further details, refer to any of the widely recognized references in the field, e.g. *Applied Cryptography* by Bruce Schneier, John Wiley & Sons, Inc., (1994).

In general, a commonly used certification message will include the name of the entity (e.g. the name of the merchant acquirer), the public key for that entity, and a certification by the central authority that the public key belongs to the identified merchant acquirer. Also attached to this message is a digital signature that is generated by the certification authority. Typically, the authority generates the digital signature by using a known algorithm to hash the message into a smaller block of information and then by encrypting the hash using its private key.

An entity can verify the authenticity of a public key as follows. First, it uses the same algorithm to generate a hash from the message. Then, it uses the public key of the certification authority to decrypt the digital signature. Finally, it compares the decrypted signature with the hash of the message. If they match, the entity knows that the public key belongs to the entity identified in the certification message.

Obviously, for certification to work, it is assumed that everyone has and trusts the certification authority's public key.

Note that in the described embodiment, it may also be desirable to have the certification message indicate that the merchant acquirer is also linked to the merchant. This can be done by having the certification include both the merchant's public key and the merchant acquirer's public key as part of a single message to which a digital signature is attached by the certification authority.

Figure 2C:
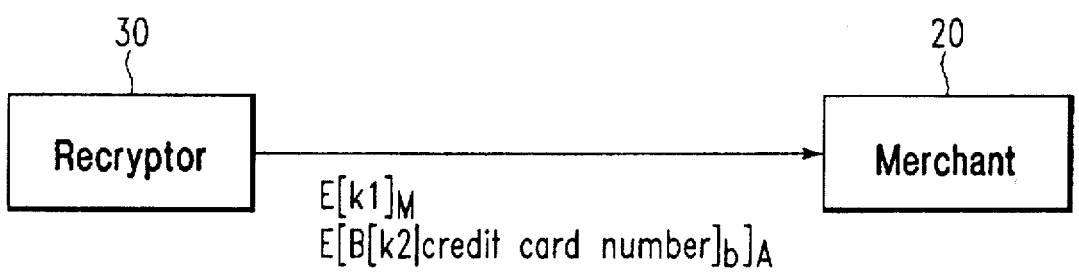
FIG. 2C shows the information that the recryptor service sends back to the merchant.

Referring to FIGS. 2C and 3, using its private key recryptor 30 decrypts both of the received key exchange blobs. Then, using the public keys that were sent by merchant 20, recryptor 30 re-encrypts the two pieces of information, using a different public key for each piece. More specifically, recryptor 30 decrypts the GSO key exchange blob and checks the merchant name contained within the decrypted key exchange blob to verify that the key is indeed intended for merchant 20. If the merchant's name is the same as the name that is associated with public key M, which was sent by merchant 20, recryptor 30 then re-encrypts k1 using the merchant's public key to produce a new key exchange blob: $E[k1]_M$. After re-encryption of stream cipher key k1, merchant 20 will be the only party that is able to read the encrypted message and learn the contents of k1, assuming of course that the merchant's private key corresponding to public key M has not been compromised.

Recryptor 30 also decrypts the blinded PI key exchange blob. This produces a message that is still blinded and thus unreadable by recryptor 30. Recryptor 30 then re-encrypts the blinded message using the merchant acquirer's public key A to generate a new key blob: $E[B[k2|credit\ card\ number]_b]_A$.

Continuing with the previously described example where message X was blinded and encrypted to generate Y, when recryptor 30 decrypts Y using its private key the result is:

$$Z = Y^r \bmod N = Xb \bmod N$$

Thus, even though recryptor 30 has private exponent r, it still is not able to determine the value of X without knowing the value of b. After recryptor 30 re-encrypts this message, the result will be:

$$W = (Xb)^A \bmod N$$

Recryptor 30 then sends the two new key exchange blobs to merchant 20.

Figure 2D:
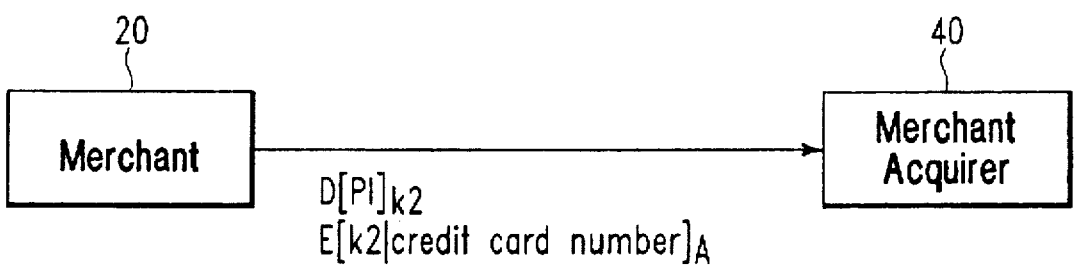
FIG. 2D shows the information that the merchant forwards to the merchant acquirer.

Referring to FIGS. 2D and 3, merchant 20 decrypts the new GSO key exchange blob received from recryptor 30 thereby obtaining the stream cipher key, k1. With k1, merchant 20 is able to decrypt the encrypted GSO that it had previously obtained from consumer 10. Thus, merchant 20 can now read and process the GSO.

Since merchant 20 does not have the merchant acquirer's private key, it cannot gain access to k2 in the other key exchange blob that was just received from recryptor 30. However, to render the block of information decipherable by merchant acquirer 40, merchant 20 must unblind it. Continuing with the example on the RSA blinding algorithm, merchant 20 must remove the blinding factor b. Since merchant 20 knows the blinding factor b, it also can easily compute its inverse. Thus, to unblind the block of information, merchant 20 simply encrypts the inverse of b using the merchant acquirer's public key and then multiplies the blinded message by this quantity mod N. The resulting message is:

$$V = W \times (b^{-1})^A \bmod N = X^A \bmod N$$

which can be deciphered by the merchant acquirer by applying the private key a. (Note: In order for the above-described RSA blinding scheme to work properly, the modulus of the recryptor must be less than the modulus of the merchant acquirer, i.e., the recryptor's public key must be smaller than the merchant acquirer's public key.)

It should be further noted that the blinding algorithm that is used must have the property that the result does not depend upon the order in which the unblinding and decryption operations are performed. That is, the encrypting and blinding operations must be commutative.

Merchant 20 then sends to merchant acquirer 40 the block encrypted PI (i.e., $D[PI]_{k2}$) and the re-encrypted PI key exchange blob, $E[k2|credit\ card\ number]_A$.

Upon receipt of the block encrypted PI and the unblinded key blob, merchant acquirer 40 uses its private key to decrypt the key exchange blob. This gives merchant acquirer 40 access to both key k2 and the consumer's credit card number. With the k2, merchant acquirer 40 then decrypts the block encrypted PI and processes it.

Communications in addition to those described above may take place among the entities to complete the transaction. For example, the merchant acquirer after conducting its own check on the credit card may then send an acknowledgment to the merchant either accepting or rejecting the transaction. The merchant could then send a similar acknowledgment to the consumer informing the consumer of the outcome of the purchase request. Such additional communications are secondary to the transfers of transactional information and will of course vary depending upon the particular practices and expectations in the industry which is using the above-described electronic transactions, thus they have not been represented in the figures.

In the above-described embodiment, the consumer uses a stream cipher on the GSO and a block cipher on the PI. In any event, it should be understood that the algorithms that are used in the described embodiment and the differences between stream cipher encryption and the block encryption are not central to the invention.

Though public key algorithms are strong, they are also characteristically slow; thus, it is desirable to avoid using them for encrypting the GSO, which is a large string of information. The shared key algorithms are much faster than the public key algorithms. Thus for performance reasons, it is desirable to encrypt the largest part of the data by means of the shared key algorithms and put only what is necessary into the portion that is encrypted using the public key algorithm.

The information that is included with k2 is any information which is intended for the merchant acquirer but should not be disclosed to other parties to the communications. In the described embodiment this information includes the credit card number, which is assumed to be the most valuable information that is being transmitted and thus deserving of the highest level of protection. That is one reason for including it with the block encryption key k2, since public key encryption is the strongest of the different techniques used during the communications.

In the described embodiment, the recryptor obtained the public keys of the merchant and the merchant acquirer from the merchant. Alternatively, the recryptor could use a local directory or a remotely located directory service (see block 35 in FIG. 1) to obtain the public keys that are required. However, if the recryptor uses a local directory which it maintains, there will be added overhead associated with storing all of the keys that may be needed and keeping them current. Since the responsibility of maintaining a local directory can become quite burdensome, the more attractive alternative is to rely on other parties to supply the public keys.

It should be understood that the invention is not limited to sending GSO's and PI's or commerce transactions. It can be used for exchanging any kind of information and particularly any kind which involves the same types of considerations that exist for commercial transactions.

Figure 4A:
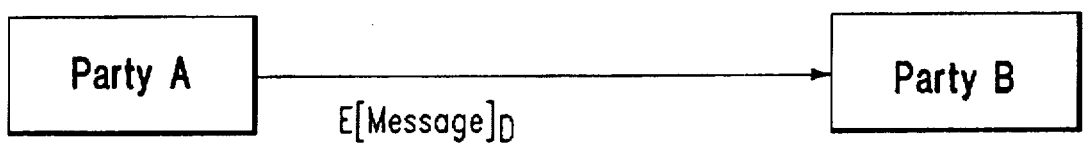
FIGS. 4A–C show a way to use blinding and a third party Decryptor to send secure communications to another party.
Figure 4B:
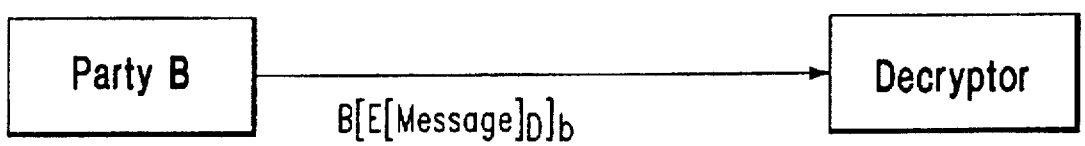
Figure 4C:
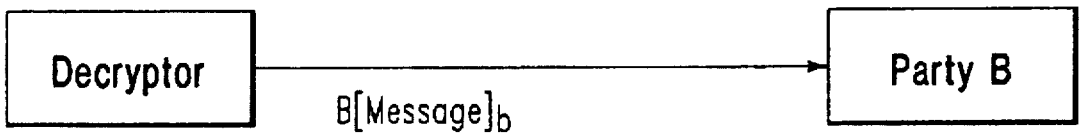

Other embodiments are within the following claims. For example, as illustrated in FIGS. 4A–C, the above-described blinding technique can be used by a Party A to send secure messages or communications to a Party B when Party A does not know the public key (or any key) of Party B. If Party A knows the public key for a Decryptor 50, Party A sends encrypts the message using the Decryptor's public key and sends the encrypted message (i.e., E[Message]$_D$) to Party B. Then, Party B blinds this encrypted message, in the manner described above, and sends the blinded and encrypted message (i.e., B[E[Message]$_R$]$_b$) to the Decryptor. The Decryptor uses its private key to decrypt the received message producing a message that is still blinded (i.e., B[Message]$_b$). The Decryptor sends this message back to Party B, which then unblinds the message and reads it.

In this example, again it should be understood that the particular technique of encryption that is used is not critical but rather it is the use of encryption in combination with blinding, which prevents the Decryptor from being able to read the message sent to Party B.

Figure 5:
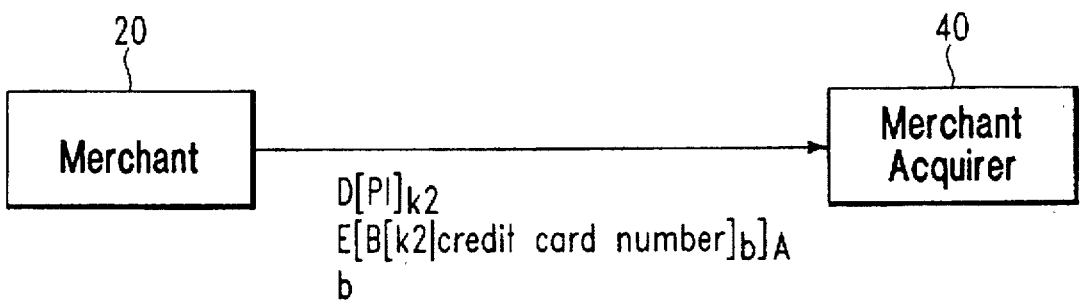
FIG. 5 shows an alternative approach to that shown in FIG. 2D according to which the Merchant sends the blinded message along with the blinding factor to the Merchant Acquirer.

One can modify the protocol shown in FIGS. 2A–D in another way. As shown in FIG. 5, instead of having the Merchant unblind the message received back from the Recryptor, the Merchant can send the blinded message along with the blinding factor to the Merchant Acquirer (also see FIG. 6). Some form of encryption could be applied to the message which the Merchant sends the Merchant Acquirer to make this as a secure communication. The Merchant Acquirer can then use the blinding factor to unblind the blinded message, obtain the key and decrypt the encrypted PI.

Figure 6:
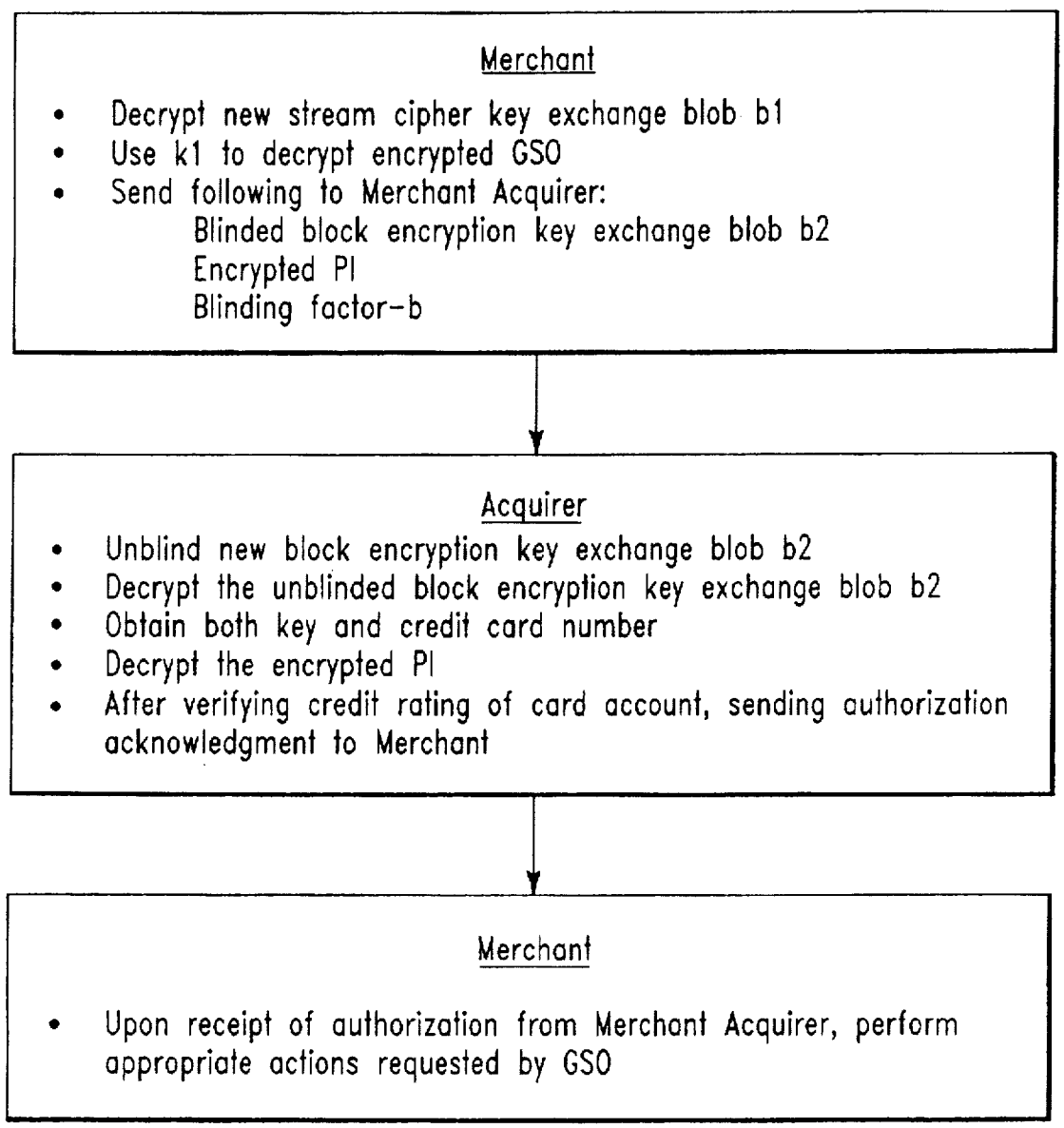
FIG. 6 is a flow chart showing operations that are performed under the alternative approach illustrated in FIG. 5.

Of course, in the above-described scenarios, it is also assumed that the parties act on the information that they have received. For example, in the case of the Merchant Acquirer as shown in FIG. 6, upon obtaining the PI and the credit card number of the Consumer, the Merchant Acquirer checks the credit card number to verify that it is still valid and that sufficient credit exists to honor the PI. Upon clearing the Consumer's transaction request, the Merchant Acquirer then sends an acknowledgment to the Merchant authorizing the transaction. Upon receiving the authorization to go forward with the transaction, the Merchant then delivers or supplies whatever goods and/or services were requested in the GSO.

What is claimed is:

1. An encryption method comprising:

receiving from a first party a message that has a first part, wherein the first part includes a first block of information that is encrypted by using a public key R of a recryptor's public key-private key pair;

blinding the first part;

sending the blinded first part to a recryptor; and receiving from the recryptor a second block of information which is the first block of information blinded and decrypted using the private key of the recryptor's public key-private key pair.

2. The encryption method of claim 1 further comprising unblinding the second block of information.

3. An encryption method comprising:

receiving from a first party a blinded message that was also encrypted by using a public key R of a public key-private key pair;

decrypting the blinded message by using the private key of the public key-private key pair; and sending the decrypted, blinded message back to the first party.

\* \* \* \* \*